(12) United States Patent
Itakura et al.

(10) Patent No.: US 11,167,376 B2
(45) Date of Patent: Nov. 9, 2021

(54) METHOD FOR ROUGHENING METAL MOLDED BODY SURFACE

(71) Applicant: DAICEL POLYMER LTD., Tokyo (JP)

(72) Inventors: Masahiko Itakura, Tokyo (JP); Masahiro Katayama, Himeji (JP); Takayuki Uno, Himeji (JP)

(73) Assignee: DAICEL POLYMER LTD., Tokyo (JP)

( * ) Notice: Subject to any disclaimer, the term of this patent is extended or adjusted under 35 U.S.C. 154(b) by 329 days.

(21) Appl. No.: 16/324,427

(22) PCT Filed: Aug. 31, 2017

(86) PCT No.: PCT/JP2017/031328
§ 371 (c)(1),
(2) Date: Feb. 8, 2019

(87) PCT Pub. No.: WO2018/043637
PCT Pub. Date: Mar. 8, 2018

(65) Prior Publication Data
US 2019/0176268 A1 Jun. 13, 2019

(30) Foreign Application Priority Data

Sep. 2, 2016 (JP) .............................. JP2016-172187
Oct. 24, 2016 (JP) .............................. JP2016-207688
(Continued)

(51) Int. Cl.
*B23K 26/354* (2014.01)
*B23K 26/00* (2014.01)
*B23K 101/34* (2006.01)

(52) U.S. Cl.
CPC ............ *B23K 26/354* (2015.10); *B23K 26/00* (2013.01); *B23K 2101/34* (2018.08)

(58) Field of Classification Search
CPC ................ B23K 2101/34; B23K 26/00; B23K 26/0622; B23K 26/354; B23K 26/3584
(Continued)

(56) References Cited

U.S. PATENT DOCUMENTS

| 6,120,725 | A | 9/2000 | Asahi et al. | |
|---|---|---|---|---|
| 2014/0205801 | A1* | 7/2014 | Iwata | B29C 59/022 428/141 |
| 2016/0046050 | A1* | 2/2016 | Ikeda | B23K 26/354 264/478 |

FOREIGN PATENT DOCUMENTS

| JP | 04-351279 A | 12/1992 |
|---|---|---|
| JP | 10-294024 A | 11/1998 |

(Continued)

OTHER PUBLICATIONS

English Language Translation of JP2015142943 (Year: 2015).*
(Continued)

*Primary Examiner* — Dana Ross
*Assistant Examiner* — Joseph W Iskra
(74) *Attorney, Agent, or Firm* — Flynn Thiel, P.C.

(57) ABSTRACT

A method for roughening a surface of a metal molded body which can be used as an intermediate for manufacturing a composite molded body of a metal molded body with a resin, a rubber, a metal, or the like is provided. The method for roughening a metal molded body surface includes a step of irradiating the surface of the metal molded body with laser light at an irradiation rate of 2000 mm/sec or more with an energy density of 1 MW/cm² or more using a laser apparatus, and the laser light irradiation step is a step of irradiating laser light so that laser light-irradiated portions and non-laser light-irradiated portions are generated alternately when the laser light is irradiated to be in a straight line, a curved line, or a combination of a straight line and a
(Continued)

curved line on the surface of the metal molded body to be roughened.

7 Claims, 14 Drawing Sheets

(30) Foreign Application Priority Data

Mar. 10, 2017 (JP) .............................. JP2017-046324
Aug. 4, 2017 (JP) .............................. JP2017-151293

(58) Field of Classification Search
USPC ................................................... 219/121.65
See application file for complete search history.

(56) References Cited

FOREIGN PATENT DOCUMENTS

| | | | |
|---|---|---|---|
| JP | 11-147185 | A | 6/1999 |
| JP | 2005-103553 | A | 4/2005 |
| JP | 2011-006743 | A | 1/2011 |
| JP | 5701414 | B1 | 4/2015 |
| JP | 2015142943 | A | 8/2015 |
| JP | 5774246 | B2 | 9/2015 |
| JP | 2016-007589 | A | 1/2016 |
| JP | 2016-036884 | A | 3/2016 |
| JP | 2016-043413 | A | 4/2016 |

OTHER PUBLICATIONS

English Language Translation of JP5774246 (Year: 2013).*
English Language Translation of JPH10294024A (Year: 1997).*
English Language Translation of JPH10294024 (Year: 1997).*
English Language Translation of JP2005103553 (Year: 2003).*
English Language Translation of JPH11147185 (Year: 1997).*
English International Preliminary Report on Patentability for corresponding PCT/JP2017/031328, dated Mar. 5, 2019 (1 page).
English Written Opinion of the International Searching Authority for corresponding PCT/JP2017/031328, dated Oct. 10, 2017 (7 pages).
English International Search Report issued in International Application No. PCT/JP2017/031328, dated Oct. 10, 2017 (2 pgs).
Extended European Search Report and opinion for corresponding Application No. 17846641.3 dated Jul. 31, 2020 (6 pages).
Japanese Office Action dated Apr. 17, 2018 for corresponding application No. 2017-151293, with partial English translation thereof (8 pages).
Japanese Office Action dated Sep. 19, 2019 for corresponding application No. 2017-151293, with partial English translation thereof (6 pages).

* cited by examiner

EXAMPLE 4

(a)

(b)

EXAMPLE 8

(a)

(b)

EXAMPLE 13

EXAMPLE 16

(a)

b)

EXAMPLE 18

EXAMPLE 20

(a)

(b)

METHOD FOR ROUGHENING METAL MOLDED BODY SURFACE

FIELD OF THE INVENTION

The present invention relates to a method for roughening a metal molded body surface which can be used as an intermediate for manufacturing a composite molded body of a metal molded body and a resin, a rubber, a metal, or the like.

BACKGROUND OF THE INVENTION

In manufacturing a composite molded body made of a metal molded body and a resin molded body, a technique is known in which a surface of a metal molded body is roughened first and then unified. JP-B 5774246 discloses a method for roughening a metal molded body surface for roughening a surface of the metal molded body in which the surface of the metal molded body is roughened by continuously irradiating laser light at an irradiation rate of 2000 mm/sec or more using a continuous wave laser. In a composite molded body obtained by joining a resin molded body with the metal molded body after performing the surface roughening method of the invention disclosed in JP-B 5774246, joint at a high joining strength is achieved between the metal molded body and the resin molded body (JP-B 5701414).

SUMMARY OF THE INVENTION

It is an object of the present invention to provide a method for roughening a metal molded body surface for roughening a surface of the metal molded body which can be used as an intermediate for manufacturing a composite molded body of a metal molded body and a resin, a rubber, a metal, or the like.

Solution to Problem

The present invention provides a method for roughening a metal molded body surface including:

a laser light irradiation step of irradiating a surface of the metal molded body with laser light at an irradiation rate of 2000 mm/sec or more with an energy density of 1 MW/cm$^2$ or more using a laser apparatus, wherein the laser light irradiation step is a step of irradiating laser light so that laser light-irradiated portions and non-laser light-irradiated portions are generated alternately when the laser light is irradiated to be in a straight line, a curved line, or a combination of a straight line and a curved line on the surface of the metal molded body to be roughened.

According to the method for roughening a metal molded body surface of the present invention, the surface of the metal molded body may be formed into a complex porous structure. Therefore, the surface-roughened metal molded body can be used for manufacturing a composite molded body with a molded body made of a resin, a rubber, a metal, or the like.

BRIEF DESCRIPTION OF THE DRAWINGS

FIG. 2 is a diagram illustrating irradiation patterns of laser light when the method for roughening a metal molded body surface of the present invention is performed, in which FIG. 2(a) illustrates a monodirectional irradiation pattern, and FIG. 2(b) illustrates a bidirectional irradiation pattern.

FIG. 14 FIGS. 14(a) to (c) are explanatory diagrams illustrating a method for measuring an amount of deformation in Examples 23 to 25 and Comparative Examples 1 to 3.

EMBODIMENTS OF THE INVENTION

Figure 1:
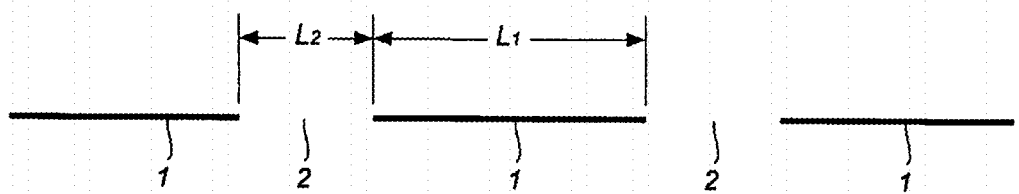
FIG. 1 is a diagram illustrating a state of irradiation of laser light according to an embodiment when a method for roughening a metal molded body surface of the present invention is performed.

A method of the present invention for roughening a metal molded body surface is directed to roughen a surface of a metal molded body, in the same manner as in JP-B 5774246 and JP-B 5701414, by irradiating laser light under laser light irradiation conditions different from laser light irradiation conditions described in JP-B 5774246 and JP-B 5701414.

The method of the present invention for roughening a metal molded body surface includes a laser light irradiation step of irradiating a surface of a metal molded body with laser light at an irradiation rate of 2000 mm/sec or more with an energy density of 1 MW/cm$^2$ or more using a laser apparatus.

The metal of the metal molded body used in the present invention is not specifically limited, and may be suitably selected from known metals depending on the application. For example, examples of the metal include those selected from iron, various types of stainless, aluminum, zinc, titanium, copper, brass, chromium plated steel, magnesium, and alloys containing these metals, and cermet such as tungsten carbide, chromium carbide, and the like, and these metals which are surface-treated by alumite treatment, plating treatment and the like are also applicable.

The shape of the metal molded body used in the present invention is not specifically limited, and those suitable for the applications may be used. Although the thickness of the metal molded body is not specifically limited, the method of the present invention for roughening a metal molded body surface is excellent in that deformation such as warping does not occur often even when a surface of a molded body having a small thickness is roughened. For this reason, the present invention is suitable for a thin metal molded body having a thickness of 10 mm or less at a portion to be irradiated with laser light, and is suitable for a metal molded body having a thickness of preferably 5 mm or less, more preferably 2 mm or less, and further preferably 1 mm or less.

The laser apparatus used in the present invention needs simply to be capable of irradiating laser light at an energy density of 1 $MW/cm^2$ or more and at an irradiation rate of 2000 mm/sec or more.

The energy density at the time of irradiation of the laser light is determined from an output (W) of the laser light and the laser light (spot area ($cm^2$) ($\pi \cdot$[spot diameter/2]$^2$). The energy density at the time of irradiation of the laser light is preferably from 2 to 1000 $MW/cm^2$, more preferably from 10 to 800 $MW/cm^2$, and further preferably from 10 to 700 $MW/cm^2$. When the energy density is too high, the metal does not melt and but sublimates, and thus holes having a complex structure cannot be formed.

The irradiation rate of the laser light is preferably from 2,000 to 20,000 mm/sec, more preferably from 2,000 to 18,000 mm/sec, and further preferably from 3,000 to 15,000 mm/sec.

The output of the laser light is preferably from 4 to 4000 W, more preferably from 50 W to 2500 W, further preferably from 150 to 2000 W, and further preferably from 150 to 1500 W. The wavelength is preferably from 500 to 11,000 nm. The beam diameter (spot diameter) is preferably from 5 to 80 μm, and further preferably from 5 to 40 μm.

The defocus distance is preferably −5 to +5 mm, more preferably −1 to +1 mm, and further preferably −0.5 to +0.1 mm. The defocus distance may be set to a constant value for laser irradiation, or laser light may be irradiated while changing the defocus distance. For example, when laser irradiation is performed, the defocus distance may be reduced or may be periodically increased and decreased.

In the present invention, when a metal molded body is irradiated with laser light which satisfies the energy density and the irradiation rate described above, a surface of the metal molded body is partially evaporated while being melted, and consequently, holes having a complex structure are formed. On the other hand, if the energy density and the irradiation rate described above are not satisfied, the surface of the metal molded body is sublimated and thus holes (holes formed by ordinary pulse laser irradiation) are formed or is even melted (laser welding), and thus holes having a complex structure are not formed.

According to the method of the present invention for roughening a metal molded body surface, laser light is irradiated so that laser light-irradiated portions and non-laser light-irradiated portions are generated alternately when the laser light is irradiated to be in a straight line, a curved line, or a combination of a straight line and a curved line on the surface of the metal molded body to be roughened after the energy density and the irradiation rate described above are satisfied. The laser light is irradiated so as to draw, on the surface of a metal molded body, straight lines, curved lines, or a combination of the straight lines and the curved lines, and each of the straight lines and the curved lines is composed of alternately continuous laser light-irradiated portions and non-laser light-irradiations portions.

Irradiation with laser light so that the laser light-irradiated portions and the non-laser light-irradiated portions are generated alternately includes an irradiation embodiment as illustrated in FIG. 1. FIG. 1 illustrates a state in which: a laser light-irradiated portion 1 having a length L1; and a non-laser light-irradiated portion 2 having a length L2 located between adjacent laser light-irradiated portions 1 having a length L1 are generated alternately and are formed in a dotted-line pattern as a whole. The dotted line includes also chain lines such as single dot lines, and two-point chain lines.

In this case, the laser light can be repeatedly irradiated so as to make a dotted line extending on a single straight line in appearance as illustrated in FIG. 1. The number of times of repetition (the number of times of irradiation) may be 1 to 20 times, for example. When the irradiation is performed by a plurality of times, the laser light-irradiated portions may be the same; or, by differentiating the laser light-irradiated portions (shifting the laser light-irradiated portions), the surface of the whole which is linearly irradiated may be roughened.

When irradiation is performed a plurality of times with the same laser light-irradiated portions, it is performed in a dotted line pattern. However, when laser light-irradiated portions are shifted, that is, irradiation is repeated by shifting such that the portions not irradiated with laser light at first are overlapped with laser light-irradiated portions, irradiation in a solid line is preferably achieved in the end even when irradiation is made in a dotted line pattern. Note that the irradiated portions/non-irradiated portions in a dotted line pattern and the irradiated portions in a solid line pattern may be referred to as "lines" in the following description.

When a metal molded body is irradiated with laser light continuously, the temperature of an irradiated surface increases, and thus a deformation such as warpage may occur in the molded body having a small thickness. Therefore, a countermeasure such as cooling may be required. However, as shown in FIG. 1, when laser irradiation is performed in a dotted line pattern, the laser light-irradiated portions 1 and the non-laser light-irradiated portions 2 are generated alternately, and the non-laser light-irradiated portions 2 are cooled. Thus, when the irradiation of laser light is continued, probability of occurrence of the deformation such as warpage is preferably reduced even when the thickness of the molded body is small. In this case, the same effect is achieved even when the laser light-irradiated portions are varied (laser light-irradiated portions are shifted), as described above.

When the metal molded body is continuously irradiated with laser light, the temperature of the irradiated surface is increased, and melted small pieces of metal particles scatter, adhere to the metal molded body or peripheral members thereof, and remain as spatter. However, when the laser irradiation is performed in a dotted line pattern as illustrated in FIG. 1, the amount of the spatter may be preferably reduced compared with the case where irradiation with laser light is continuously performed.

Figure 2:
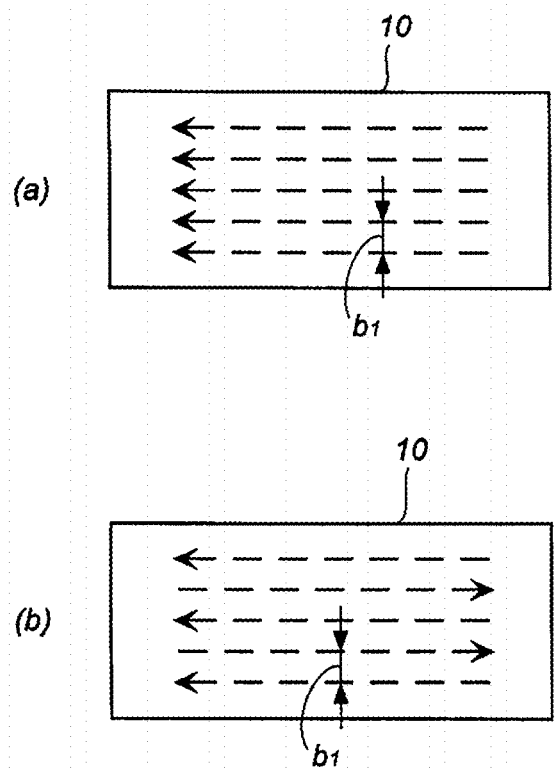

The laser light irradiation method that may be used includes a method for forming a plurality of lines by irradiating the surface of the metal molded body 10 with laser light in one direction as illustrated in FIG. 2(a), and a method for forming a plurality of lines by irradiating bidirectionally as indicated by dotted lines illustrated in FIG.

2(b). Accordingly, a desired region of the surface of the metal molded body 10 can be roughened. Alternatively, a method for irradiating laser light so that the laser light-irradiated portions in a dotted line pattern intersect with one another may also be applicable.

A distance b1 of the dotted lines after irradiation may be adjusted according to an area to be irradiated of the metal molded body, and for example, a range from 0.01 to 5 mm, preferably a range from 0.02 to 3 mm, and more preferably a range from 0.03 to 1 mm. In other words, the irradiation may be performed to form a required number of lines according to the area of the region to be surface-roughened. The lines may be formed sequentially adjacent to each other, or may be formed in any order, such as forming every other lines by a first scanning with laser light (for example, odd-numbered lines of the lines of all the lines to be formed), and forming the remaining lines (even-numbered lines) by a second scanning.

The ratio L1/L2 of the length (L1) of the laser light-irradiated portion 1 and the length (L2) of the non-laser light-irradiated portion 2 illustrated in FIG. 1 may be adjusted to range from 1/9 to 9/1, preferably from 2/8 to 8/2. When this ratio is large, efficiency of the surface-roughening step is improved, but cooling effect is lowered. In contrast, when the ratio is small, the cooling effect is improved, but surface-roughening efficiency is lowered. Depending on the material used and the degree of surface-roughening desired, the ratio can be determined in consideration of the balance of cooling and surface-roughening. The length (L1) of the laser light-irradiated portion 1 is preferably 0.05 mm or more to roughen into a complex porous structure, more preferably 0.1 to 10 mm, and further preferably 0.3 to 7 mm.

In a preferred embodiment of a method of the present invention for roughening a metal molded body surface, the laser light irradiation step described above includes laser irradiation with a duty ratio adjusted, for example, by using a fiber laser apparatus in which a modulation device of a direct modulation system to directly convert a laser drive current is connected to a laser power source.

There are two types of laser excitation; pulsed excitation and continuous excitation, and a pulse wave laser generated by the pulsed excitation is typically referred to as a normal pulse.

A pulse wave laser can be produced even by the continuous excitation. The pulse wave laser may be generated by a Q-switch pulse oscillation method, which is a method for making a pulse width (pulse-ON time) shorter than the normal pulse and oscillating laser with higher peak power correspondingly, an external modulation system which generates a pulsed wave laser by temporally cutting out light by an AOM or LN light intensity modulator, a method for pulsing by mechanically chopping, a method for pulsing by operating a galvano mirror, and a direct modulation system which generates a pulsed wave laser by directly modulating the laser drive current.

The method for pulsing by operating a galvano mirror is a method for irradiating laser light oscillated from a laser oscillator via the galvano mirror by a combination of the galvano mirror and a galvano controller. In this case, the laser light irradiation step is a step of using a combination of a galvano mirror and a galvano controller to pulse laser light continuously oscillated from the laser oscillator by the galvano controller, and adjusting a duty ratio determined from an ON time and an OFF time of an output of the laser light by an expression given below, thereby irradiating the laser light to generate laser light-irradiated portions and non-laser light-irradiated portions alternately via the galvano mirror.

Pulsing is achieved without changing the energy density of the laser light by outputting an ON/OFF gate signal periodically from the galvano controller, and turning the laser light oscillated by the laser oscillator ON/OFF by the ON/OFF signal. Accordingly, as shown in FIG. 1, laser light can be irradiated so that the laser light-irradiated portions 1 and the non-laser light-irradiated portions located between the adjacent laser light-irradiated portions 1 are generated alternately to form, as a whole, a dotted-line. The method for pulsing by operating a galvano mirror is simple in the operation because the duty ratio can be adjusted without changing the oscillation state of the laser light itself.

Among these methods, the method for pulsing by mechanically chopping, the method for pulsing by operating a galvano mirror, or the direct modulation system which generates a pulsed wave laser by directly modulating the laser drive current is preferable because it is able to achieve pulsing easily (irradiation so as to generate the irradiated portions and non-irradiated portions alternately) without changing the energy density of the continuous wave laser. This direct modulation system is configured to generate a pulse wave laser by continuously exciting laser by using the fiber laser apparatus in which a modulation device of a direct modulation system to directly convert a laser drive current is connected to a laser power source, and the laser is different from the continuous wave laser used to roughen a metal molded body surface in JP-B 5774246 and JP-B 5701414.

The duty ratio is a ratio determined by the following equation,

Duty ratio (%)=ON time/(ON time+OFF time)×100 from the ON and OFF times of the output of the laser light. The duty ratio, corresponding to L1 and L2 (i.e., L1/[L1+L2]) illustrated in FIG. 1, may be selected from a range of 10 to 90%, and preferably from 20 to 80%. Accordingly, irradiation is achieved so that the laser light-irradiated portions and the non-laser irradiated portions are generated alternately.

By irradiating laser light with the duty ratio adjusted, irradiation in a dotted line pattern as illustrated in FIG. 1 is achieved. When the duty ratio is large, efficiency of the surface-roughening step is improved, but cooling effect is lowered. In contrast, when the duty ratio is small, the cooling effect is improved, but surface-roughening efficiency is lowered. The duty ratio is preferably adjusted depending on the purpose.

In another preferred embodiment of the method of the present invention for roughening a metal molded body surface, the laser light irradiation step described above includes continuously irradiating laser in a state where masking members not allowing passage of laser light are disposed at intervals on the surface of a metal molded body to be roughened. The masking members may be or may not be in contact with the metal molded body. When irradiating each line a plurality of times, the entire metal molded body surface can be roughened by changing the positions of the masking members.

In this embodiment, laser is irradiated continuously in a state where a plurality of masking members 11 are disposed at intervals on the metal molded body 10 as illustrated in FIG. 3(a). As the masking members, a metal having a low thermal conductivity may be used. Then, when the masking members 11 are removed, formed is a dotted line in which laser light-irradiated portions and non-laser light-irradiated portions are alternately generated in the same manner as in FIG. 1.

Figure 3:
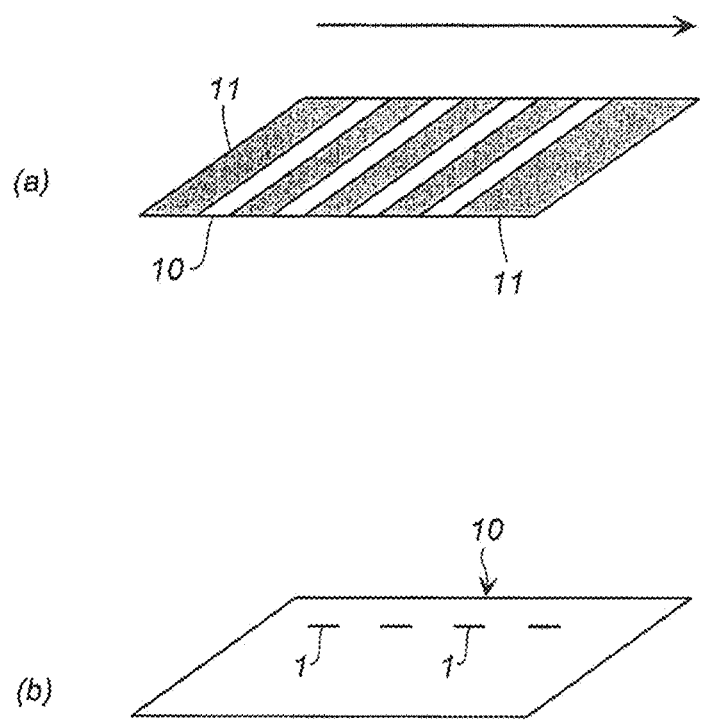
FIG. 3(a) and FIG. 3(b) are explanatory diagrams illustrating a laser light irradiation step according to another embodiment of the present invention.

In the case of the embodiment illustrated in FIG. 3, since the portions provided with the masking members 11 are cooled, probability of occurrence of the deformation such as warpage is preferably reduced even when the thickness of the molded body is small when irradiation of the laser light is continued.

The ratio L1/L2 of the length (L1) of the laser light-irradiated portion 1 and the length (L2) of the non-laser light-irradiated portion 2 may be adjusted to be ranged from 1/9 to 9/1 (that is, L1/[L1+L2] is ranged from 10 to 90%). The length (L1) of the laser light-irradiated portion 1 is preferably 0.05 mm or more to roughen into a complex porous structure, preferably 0.1 to 10 mm, and more preferably 0.3 to 7 mm.

A known continuous wave laser can be used, and for example, a $YVO_4$ laser, a fiber laser (a single mode fiber laser, a multi-mode fiber laser), an excimer laser, a carbon dioxide laser, an ultraviolet laser, a YAG laser, a semiconductor laser, a glass laser, a ruby laser, a He—Ne laser, a nitrogen-laser, a chelate laser, or a dye laser may be used.

By performing the method of the present invention for roughening a metal molded body surface, a porous structure may be formed on the surface (including a range of about 500 μm from the surface) of the metal molded body, and specifically the same complex porous structure as those illustrated in FIG. 7, FIG. 8, FIG. 24 to FIG. 26, FIG. 29 in JP-B 5774246, and FIG. 7, FIG. 8, FIG. 24 to FIG. 26, and FIG. 29 in the JP-B 5701414 may be achieved.

EXAMPLES

Examples 1 to 16

Figure 4:
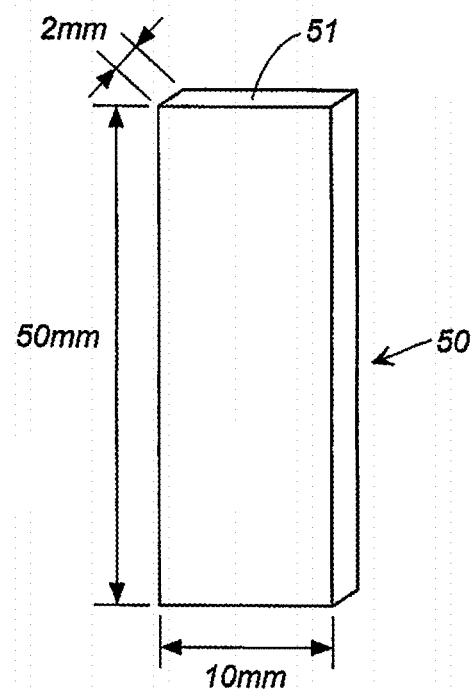
FIG. 4 is a perspective view of a metal molded body used in an example.
Figure 5:
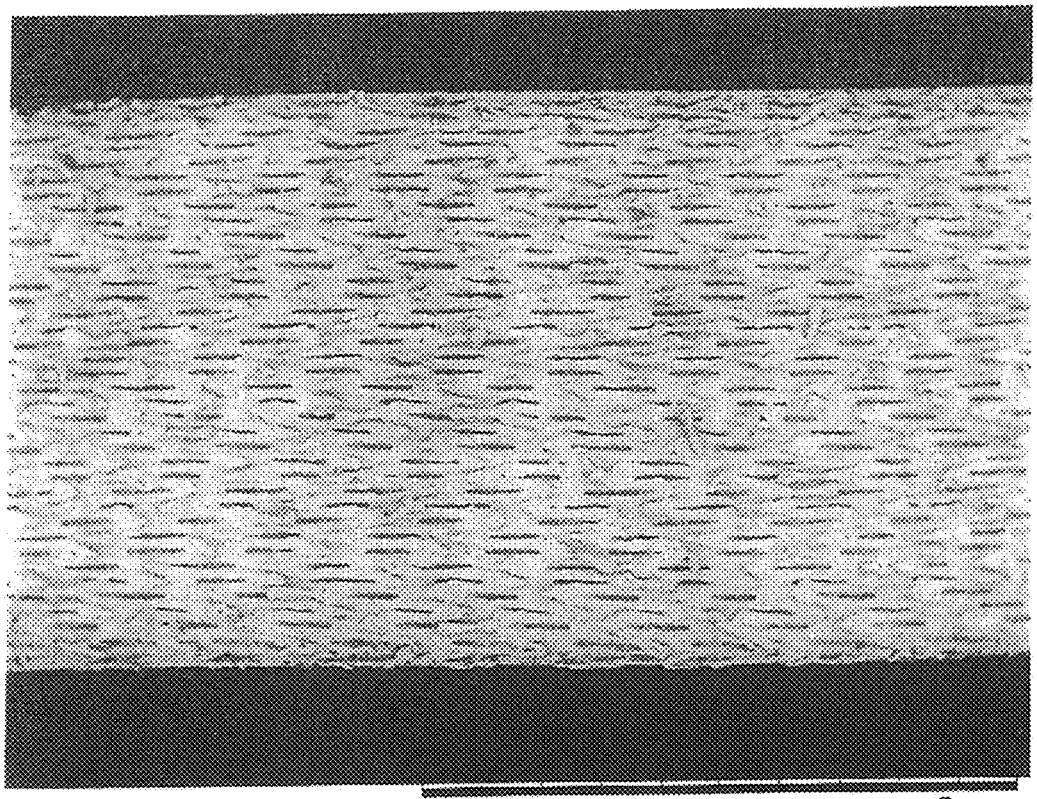
FIG. 5 is a SEM photograph of a surface of an aluminum molded body roughened in Example 1.
Figure 6:
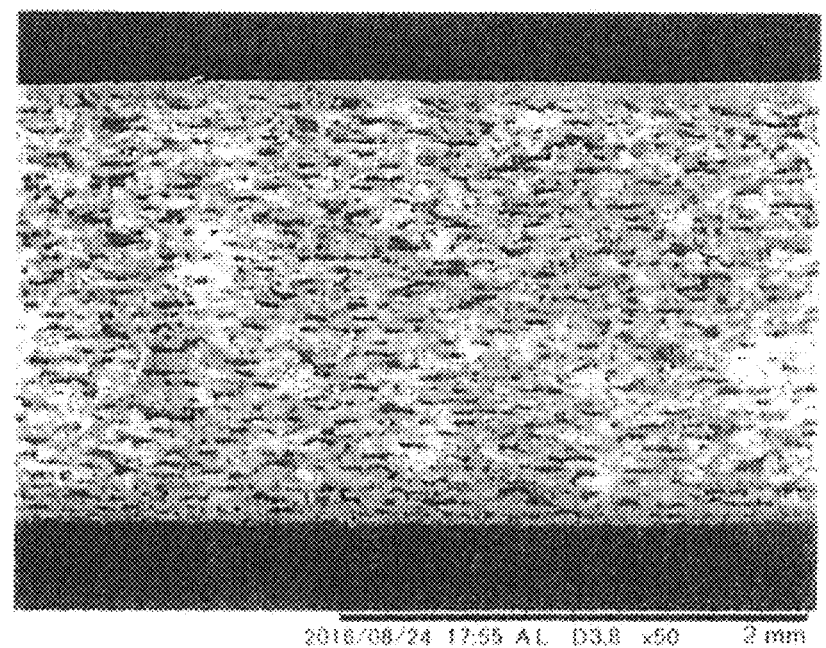
FIG. 6(a) is a SEM photograph of a surface of an aluminum molded body roughened in Example 4.
FIG. 6(b) is a SEM photograph of a cross section.
Figure 6:
Figure 7:
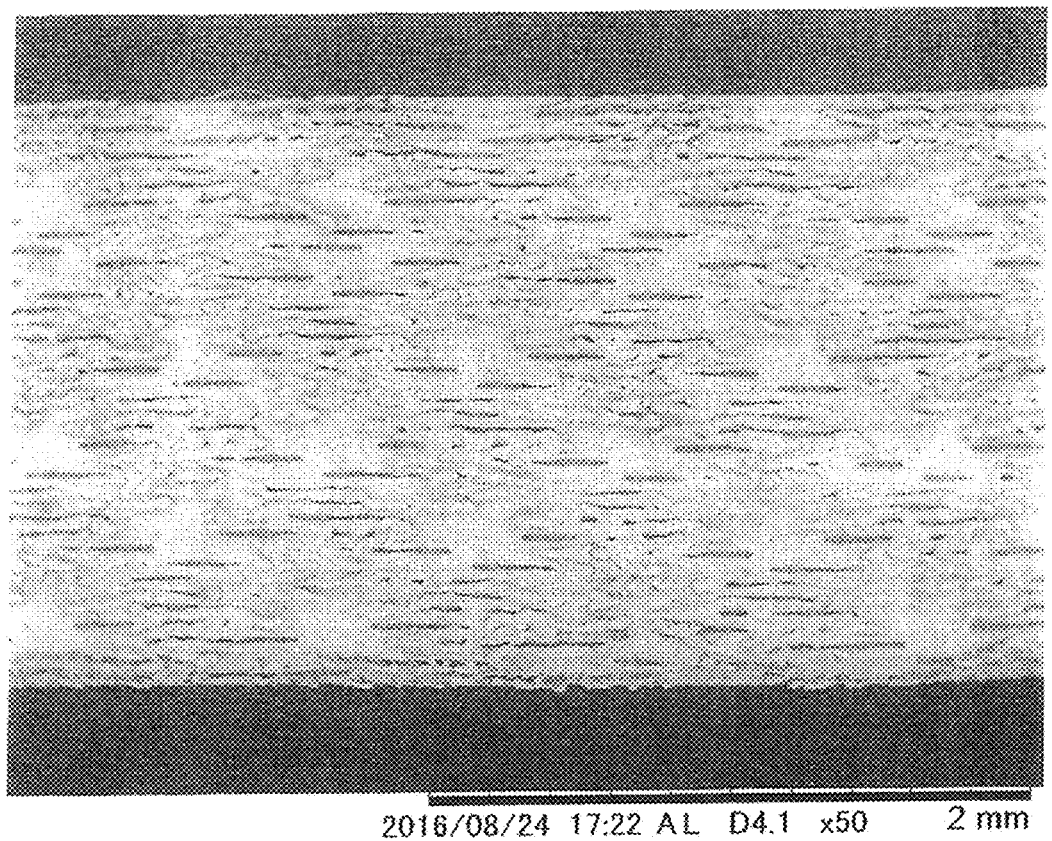
FIG. 7 is a SEM photograph of a surface of an aluminum molded body roughened in Example 5.
Figure 8:
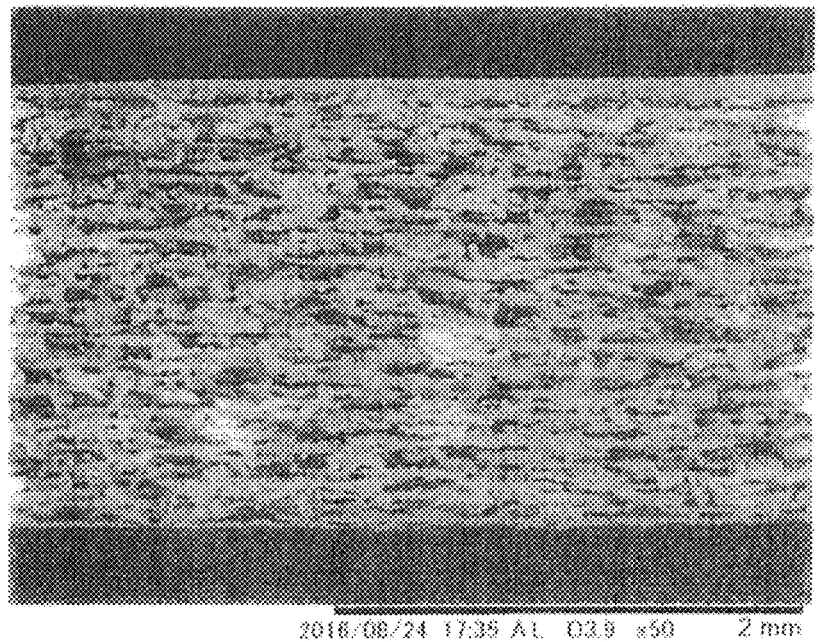
FIG. 8(a) is a SEM photograph of a surface of an aluminum molded body roughened in Example 8.
FIG. 8(b) is a SEM photograph of a cross section.
Figure 8:
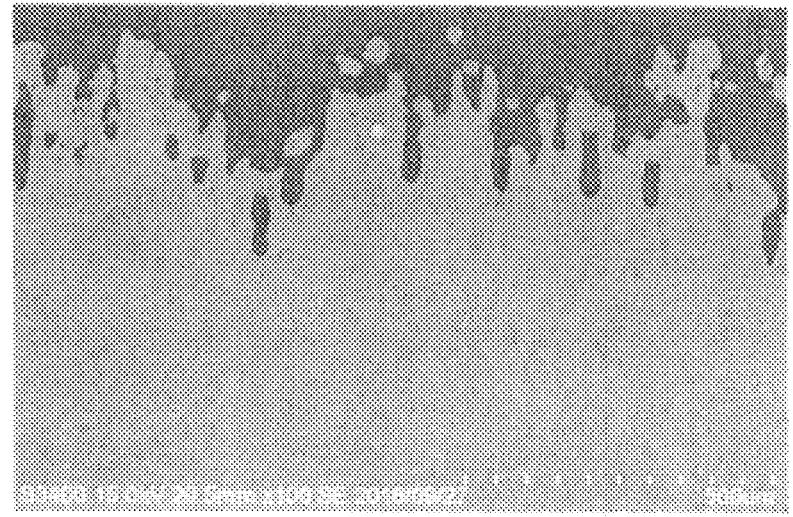
Figure 9:
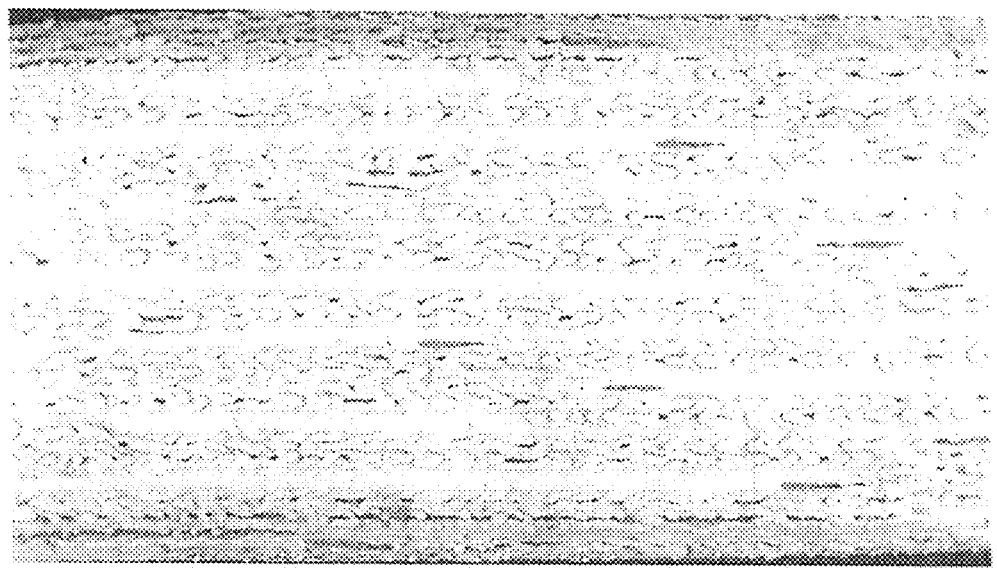
FIG. 9 is a SEM photograph of a surface of an aluminum molded body roughened in Example 13.
Figure 10:
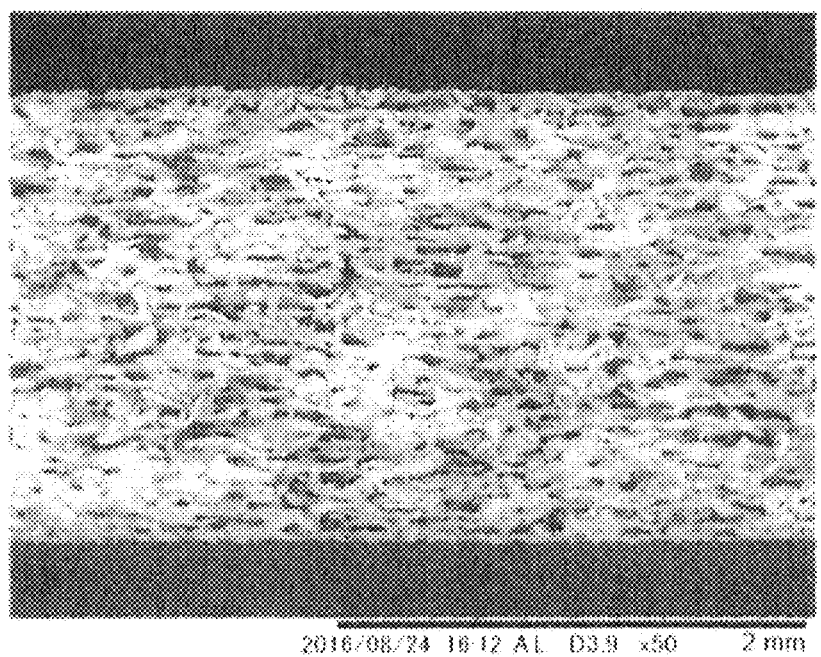
FIG. 10(a) is a SEM photograph of a surface of an aluminum molded body roughened in Example 16.
FIG. 10(b) is a SEM photograph of a cross section.
Figure 10:

An entire surface (a range of 20 $mm^2$) of a surface 51 of a metal molded body 50 (aluminum A5052) having a shape and dimensions illustrated in FIG. 4 was irradiated with laser light under conditions shown in Table 1 and a laser light irradiated surface of the surface 51 was roughened.

The laser apparatus used was as follows.
Oscillator: IPG-Yb fiber; YLR-300-SM
Condensing system: fc=80 mm/fθ=100 mm
Defocus distance: ±0 mm (constant)
Pulse wave conversion device: Pulse Generator FG110 (synthesized function generator) manufactured by Yokogawa Electric Corporation The groove depth was measured by a digital microscope VHX-900 (manufactured by Keyence Corporation) after irradiation of a surface 51 with laser light. The average groove depth was determined as an average value by measuring 10 locations. The depth of deepest portion out of 10 measured portions was determined as the maximum groove depth.

Tensile strength was obtained by a tensile test (tensile speed: 10 mm/min, distance between chucks: 50 mm) with a butt test specimen based on ISO 19095. The butt test specimen was obtained by using, as a resin, a GF 30% reinforced PA6 resin (PLASTRON PA6-GF30-01(L 9): manufactured by Daicel Polymer Ltd.); using, as an injection molding machine, ROBOSHOT S2000i 100B manufactured by FANUC CORPORATION; and performing injection molding at a resin temperature of 280° C. and a press mold temperature of 100° C.

TABLE 1

| | Examples | | | | | | | |
|---|---|---|---|---|---|---|---|---|
| | 1 | 2 | 3 | 4 | 5 | 6 | 7 | 8 |
| Type of Metal Plate | A5052 | | | | | | | |
| Thickness of Metal Plate (mm) | 50.0 | | | | | | | |
| Laser Oscillator | Single Mode Fiber Laser | | | | | | | |
| Output (W) | 274 | | | | | | | |
| Wavelength (nm) | 1070 | | | | | | | |
| Spot Diameter (mm) | 11.25 | | | | | | | |
| Energy Density (MW/$cm^2$) | 276 | | | | | | | |
| Laser Irradiation Rate (mm/sec) | 10,000 | | | | | | | |
| Irradiation State | Dotted Line (FIG. 1) | | | | | | | |
| L1/L2 | 64/36 | | | | | | | |
| Length of L1 (mm) | 0.26 | 0.26 | 0.26 | 0.26 | 0.64 | 0.64 | 0.64 | 0.64 |
| Frequency | 25,000 | 25,000 | 25,000 | 25,000 | 10,000 | 10,000 | 10,000 | 10,000 |
| Duty Ratio (%) | 64 | | | | | | | |
| Irradiation Pattern | Bidirectional (FIG. 2(b)) | | | | | | | |
| Number of Lines | 40 | | | | | | | |
| Intervals of Lines (b1) (mm) | 0.05 | | | | | | | |
| Number of Times of Repetitions (#) | 1 | 5 | 10 | 15 | 1 | 5 | 10 | 15 |
| Processing Area ($mm^2$) | 20 | | | | | | | |
| Average Groove Depth (mm) | * | 100 | 80 | 140 | 52 | 70 | 170 | 210 |
| Maximum Groove Depth (mm) | 53 | 170 | 160 | 198 | 87 | 170 | 250 | 360 |
| Tensile Strength (MPa) | 16 | 29 | 34 | 40 | 14 | 28 | 42 | 52 |

| | Examples | | | | | | | |
|---|---|---|---|---|---|---|---|---|
| | 9 | 10 | 11 | 12 | 13 | 14 | 15 | 16 |
| Type of Metal Plate | A5052 | | | | | | | |
| Thickness of Metal Plate (mm) | 50.0 | | | | | | | |
| Laser Oscillator | Single Mode Fiber Laser | | | | | | | |
| Output (W) | 274 | | | | | | | |
| Wavelength (nm) | 1070 | | | | | | | |
| Spot Diameter (mm) | 11.25 | | | | | | | |
| Energy Density (MW/$cm^2$) | 276 | | | | | | | |
| Laser Irradiation Rate (mm/sec) | 10,000 | | | | | | | |

TABLE 1-continued

| Irradiation State | | | | Dotted Line (FIG. 1) | | | | |
|---|---|---|---|---|---|---|---|---|
| L1/L2 | | | | 64/36 | | | | |
| Length of L1 (mm) | 1.28 | 1.28 | 1.28 | 1.28 | 6.40 | 6.40 | 6.40 | 6.40 |
| Frequency | 5,000 | 5,000 | 5,000 | 5,000 | 1,000 | 1,000 | 1,000 | 1,000 |
| Duty Ratio (%) | | | | 64 | | | | |
| Irradiation Pattern | | | | Bidirectional (FIG. 2(b)) | | | | |
| Number of Lines | | | | 40 | | | | |
| Intervals of Lines (b1) (mm) | | | | 0.05 | | | | |
| Number of Times of Repetitions (#) | 1 | 5 | 10 | 15 | 1 | 5 | 10 | 15 |
| Processing Area (mm²) | | | | 20 | | | | |
| Average Groove Depth (mm) | * | 100 | 190 | 190 | 25 | 80 | 100 | 140 |
| Maximum Groove Depth (mm) | 50 | 120 | 220 | 250 | 31 | 100 | 200 | 220 |
| Tensile Strength (MPa) | 10 | 25 | 38 | 47 | * | 19 | 29 | 38 |

In the examples in which the number of times of repetition is a plurality of times (5 times or more), the laser light-irradiated portions were shifted so that each irradiated line became a solid line (so that non-irradiated portions would be eliminated). The same applies to the following examples.

As can be seen from SEM photographs showing the surfaces of the metal molded bodies of Examples 1, 4, 5, 8, 13 and 16 shown in FIG. 5 to FIG. 10, and photographs of cross sections of the metal molded bodies in Example 4 (FIG. 6), Example 8 (FIG. 8), and Example 16 (FIG. 10), all of them were roughened into a complex porous structure in the same manner as those shown in FIG. 7, FIG. 8, FIG. 24 to FIG. 26, and FIG. 29 of JP-B 5774246 and FIG. 7, FIG. 8, and FIG. 24 to FIG. 26, and FIG. 29 of JP-B 5701414. As can be seen from the numerical values of the tensile strength, it is clear from Examples 1, 4, 5, 8, 13 and 16, as well as from other examples having no SEM photograph that the surface-roughening was achieved in the similar manner.

When a normal pulse wave laser is used, in a case where a pulse wave laser light is irradiated in the same manner as Comparative Examples 1, 4, and 7 of JP-B 5774246, and Comparative Examples 1, 4, and 7 of JP-B 5701414, adjacent spots are overlapped in terms of a spot diameter, a pulse width, and a laser light irradiation rate and thus, the laser light-irradiated portions and the non-laser light-irradiated portions are not generated alternately.

Examples 17 to 22

In the same manner as in Examples 1 to 16, an entire surface (a range of 20 mm²) of a surface 51 of the metal molded body 50 (stainless steel SUS304) having the shape and size illustrated in FIG. 4 was irradiated with laser light under the conditions shown in Table 2, and the surface irradiated with laser light on the surface 51 was roughened. In addition, the maximum groove depth and the tensile strength were measured in the same manner as in Examples 1 to 16.

TABLE 2

| | Examples | | | | | |
|---|---|---|---|---|---|---|
| | 17 | 18 | 19 | 20 | 21 | 22 |
| Type of Metal Plate | | | SUS304 | | | |
| Thickness of Metal Plate (mm) | | | 50.0 | | | |
| Laser Oscillator | | | Single Mode Fiber Laser | | | |
| Output (W) | | | 10 | | | |
| Wavelength (nm) | | | 1070 | | | |
| Spot Diameter (μm) | | | 11 | | | |
| Energy Density (MW/cm²) | | | 276 | | | |
| Laser Irradiation Rate (mm/sec) | | | 7,500 | | | |
| Irradiation State | | | Dotted Line | | | |
| L1/L2 | | | 64/36 | | | |
| Length of L1 (mm) | 0.19 | 0.48 | 0.48 | 0.48 | 4.80 | 4.80 |
| Frequency | 25,000 | 10,000 | 10,000 | 10,000 | 1,000 | 1,000 |
| Duty Ratio (%) | 64 | 64 | 64 | 64 | 64 | 64 |
| Irradiation Pattern | | | Bidirectional (FIG. 2(b)) | | | |
| Number of Lines | | | 40 | | | |
| Intervals of Lines (b1) (mm) | | | 0.05 | | | |
| Number of Times of Repetitions (#) | 5 | 1 | 5 | 15 | 5 | 10 |
| Processing Area (mm²) | | | 20 | | | |
| Maximum Groove Depth (μm) | 50≤ | 50≤ | 80≤ | 100≤ | 90≤ | 100≤ |
| Tensile Strength (MPa) | 20 | 5 | 27 | 37 | 18 | 30 |

Figure 11:
FIG. 11 is a SEM photograph of a surface of a stainless molded body roughened in Example 18.
Figure 12:
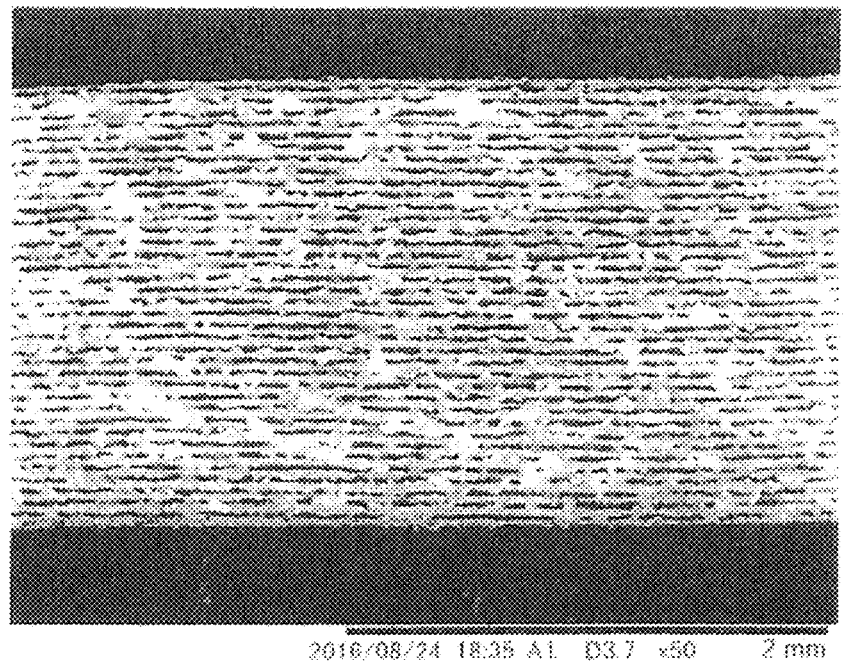
FIG. 12(a) is a SEM photograph of a surface of a stainless molded body roughened in Example 20.
FIG. 12(b) is a SEM photograph of a cross section.
Figure 12:

As can be seen from a SEM photograph showing a surface of a metal molded body of Example 18 shown in FIG. 11, and SEM photographs showing a surface and a cross section of a metal molded body of Example 20 shown in FIG. 12, both of them were roughened into the same complex porous structure as in FIG. 7, FIG. 8, FIG. 24 to FIG. 26, and FIG. 29 in JP-B 5774246, and FIG. 7, FIG. 8, FIG. 24 to FIG. 26, and FIG. 29 of JP-B FIG. 5701414. As can be seen from the numerical values of the tensile strength, it is clear that surface-roughening was achieved in the same manner in Examples 18 and 20 as well as other examples having no SEM photographs.

Note that, when a normal pulse wave laser is used, the same results as the above-described examples cannot be achieved because the result is the same as those in Comparative Examples 1, 4, and 7 of JP-B 5774246, and Comparative Example 1, 4, and 7 of JP-B 5701414.

Examples 23, 24, and Comparative Examples 1, and 2

Figure 13:
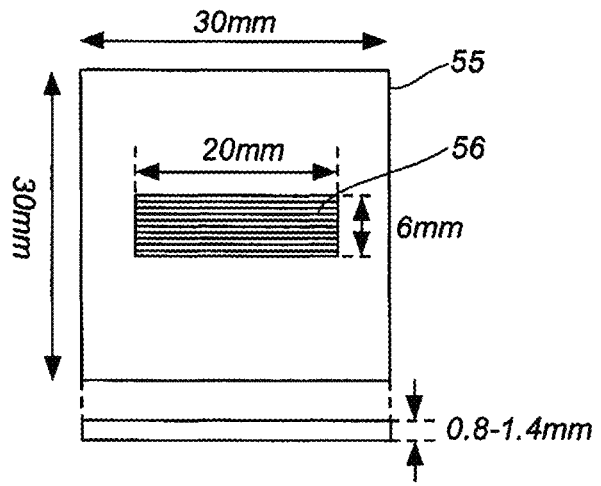
FIG. 13 is an explanatory diagram illustrating a laser irradiation method in Examples 23 to 25 and Comparative Examples 1 to 3.

Metal plates 55 (30 mm×30 mm) of a shape illustrated in FIG. 13 and having varied thicknesses (Table 3) were used, and a region 56 of 20 mm×6 mm is irradiated with laser light in the same manner as in Examples 1 to 16 in an irradiation pattern illustrated in FIG. 2(b) under the conditions shown in Table 3.

Figure 14:
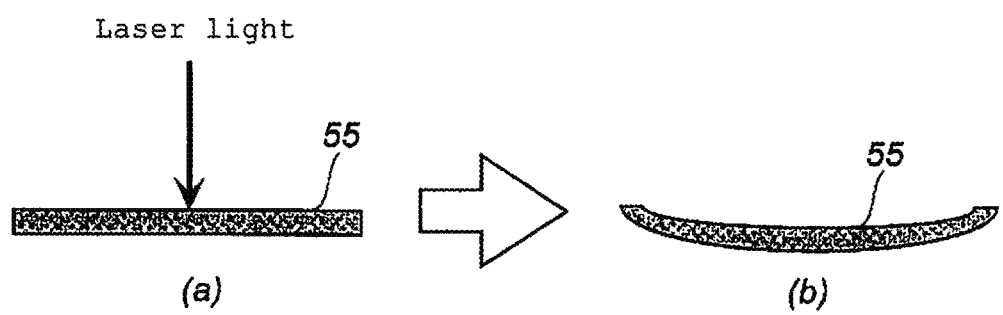
Figure 14:
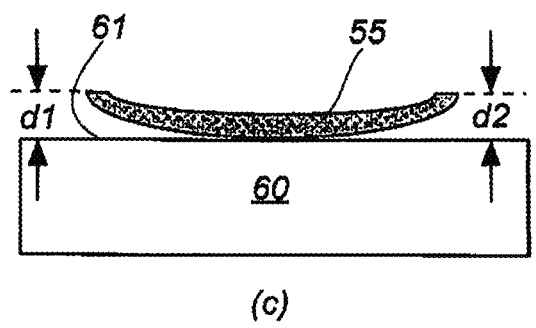
Figure 15:
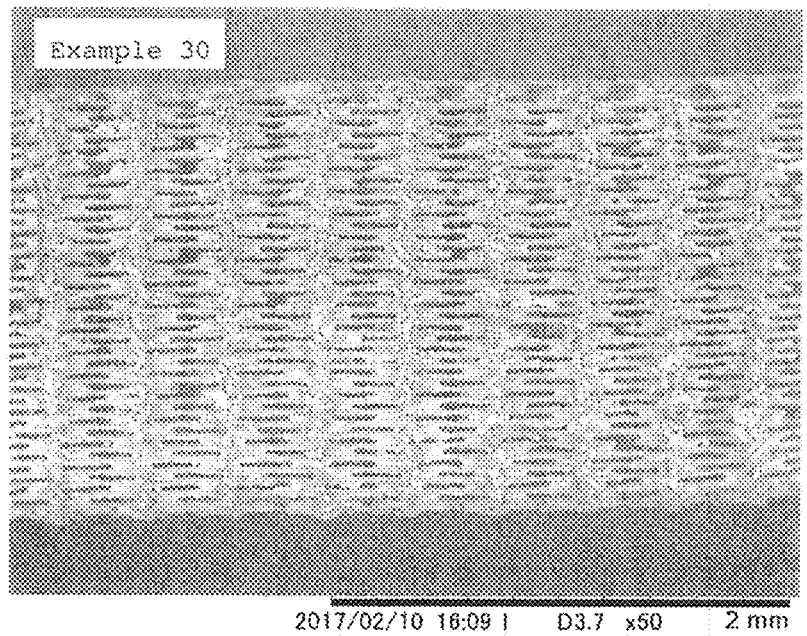
FIG. 15 is a SEM photograph of a surface of an aluminum molded body roughened in Example 30.
Figure 16:
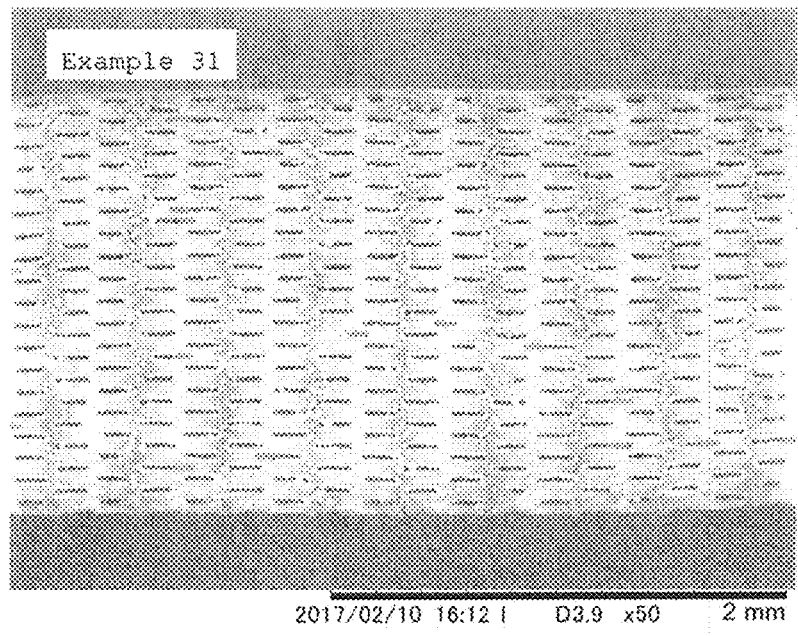
FIG. 16 is a SEM photograph of a surface of an aluminum molded body roughened in Example 31.
Figure 17:
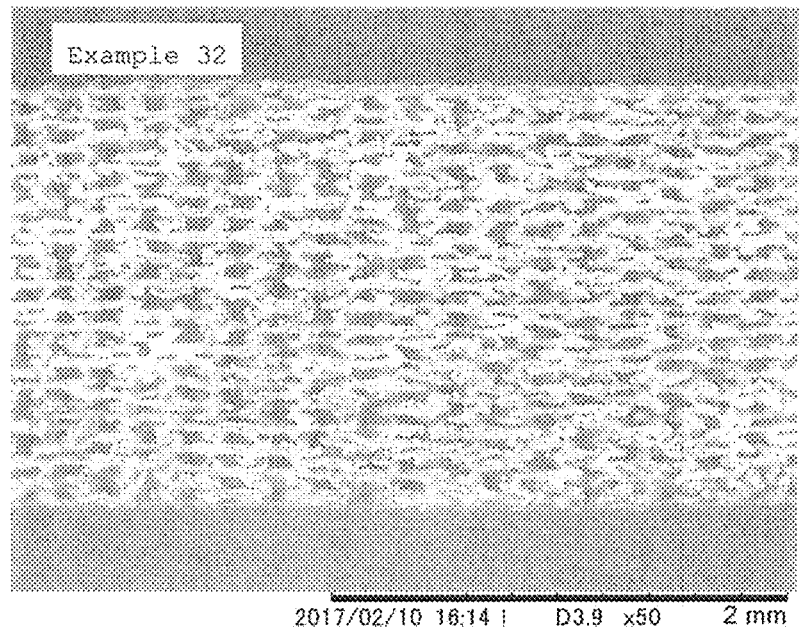
FIG. 17 is a SEM photograph of a surface of an aluminum molded body roughened in Example 32.
Figure 18:
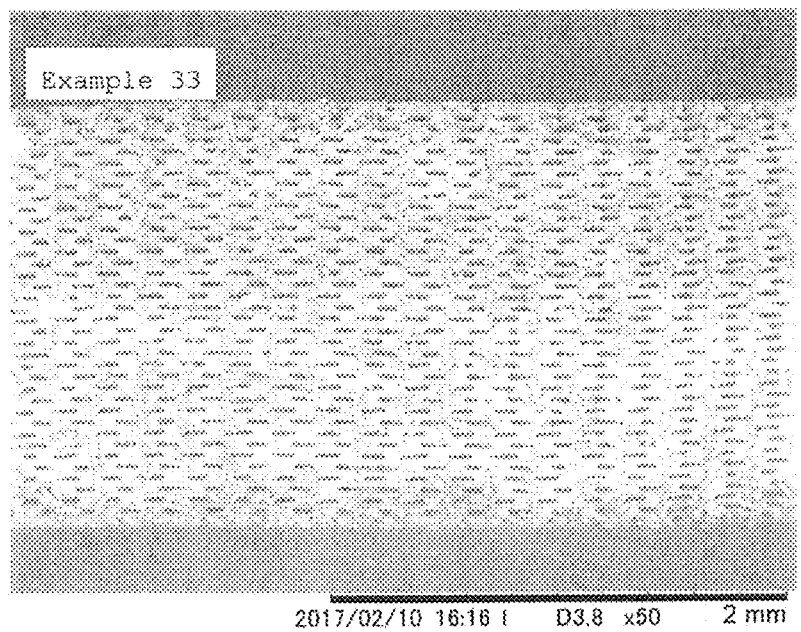
FIG. 18 is a SEM photograph of a surface of an aluminum molded body roughened in Example 33.

The amount of deformation of the metal plate 55 after irradiation of laser light was measured. A method of measurement will be described with reference to FIGS. 14(a) to (c). FIGS. 14(a) and (b) are diagrams illustrating a state before and after irradiation of laser light, and FIG. 14(b) shows the deformation in an exaggerated manner for easy understanding.

The amount of the deformation was determined by placing the metal plate 55 after the irradiation of laser light on a measuring table 60 having a plane 61, and measuring distances d1 and d2 between planes on both facing sides and the plane 61 of the measuring table 60 by a scale magnifier (30105: Ikeda Lens Industrial Co., Ltd.). The number of measured plates was 5, and average values obtained from (5×d1+5× d2)/10 are shown in Table 3.

TABLE 3

|  | Example 23 | Example 24 | Comparative Example 1 | Comparative Example 2 |
|---|---|---|---|---|
| Type of Metal Plate | A5052 | | | |
| Thickness of Metal Plate (mm) | 1.0 | 0.8 | 1.0 | 0.8 |
| Laser Oscillator | Single Mode Fiber Laser | | | |
| Output (W) | 274 | | | |
| Wavelength (nm) | 1070 | | | |
| Spot Diameter (μm) | 11.25 | | | |
| Energy Density (MW/cm$^2$) | 276 | | | |
| Laser Irradiation Rate (mm/sec) | 10000 | | | |
| Irradiation State | Dotted Line | | Solid Line | |
| L1/L2 | 64/36 | | — | — |
| Length of L1 (mm) | 1.28 | 1.28 | — | — |
| Frequency (Hz) | 5,000 | 5,000 | — | — |
| Duty Ratio (%) | 64 | | — | — |
| Irradiation Pattern | Bidirectional (FIG. 2(b)) | | | |
| Number of Lines | 120 | | | |
| Intervals of Lines (b1) (mm) | 0.05 | | | |
| Number of Times of Repetitions (#) | 20 | | | |
| Processing Area (mm$^2$) | 120 | | | |
| Machining Time (s) | 6.8 | | | |
| Amount of Deformation (mm) | 0 | 0 | 0.1 | 0.3 |

As is apparent from Table 3, when laser light was irradiated continuously, plates were slightly deformed in Comparative Examples 1 and 2, but no deformation (warpage) was found in Examples 23 and 24. From this result, it was confirmed that the surface-roughening method of the present invention was effective on a metal molded body having a small thickness. Also, as a result of a visual inspection, the amount of spatter was smaller in Examples 23 and 24 than in Comparative Examples 1 and 2.

Example 25 and Comparative Example 3

In Example 25, laser light was irradiated in the same manner as in Examples 23 and 24 under the conditions shown in Table 4, and in Comparative Example 3, laser light was irradiated in the same manner as Comparative Examples 1 and 2 under the conditions shown in Table 4. The amounts of deformation were measured in the same manner as in Examples 23 and 24.

TABLE 4

|  | Example 25 | Comparative Example 3 |
|---|---|---|
| Type of Metal Plate | SUS304 | |
| Thickness of Metal Plate (mm) | 1.4 | 1.4 |
| Laser Oscillator | Single Mode Fiber Laser | |
| Output (W) | 274 | |
| Wavelength (nm) | 1070 | |
| Spot Diameter (μm) | 11.25 | |
| Energy Density (MW/cm$^2$) | 276 | |
| Laser Irradiation Rate (mm/sec) | 7500 | |
| Irradiation Pattern | Bidirectional | |
| Irradiation State | Dotted Line | Solid Line |
| L1/L2 | 64/36 | — |
| Length of L1 (mm) | 0.96 | — |
| Frequency (Hz) | 5,000 | — |
| Duty Ratio (%) | 64 | — |
| Number of Times of Repetitions (#) | 15 | |
| Processing Area (mm$^2$) | 120 | |
| Machining Time (s) | 6.3 | |
| Amount of Deformation (mm) | 0 | 0.3 |

As is apparent from Table 4, when laser light was irradiated continuously, plates were slightly deformed in Comparative Example 3, but no deformation (warpage) was found in Example 25. From this result, it was confirmed that the surface-roughening method of the present invention was effective on a metal molded body having a small thickness. Also, as a result of a visual inspection, the amount of spatter was smaller in Example 25 than in Comparative Example 3.

Examples 26 to 33

An entire surface (a range of 20 mm$^2$) of a surface 51 of a metal molded body 50 (aluminum A5052) having a shape and dimensions illustrated in FIG. 4 was irradiated with laser light under conditions shown in Table 5 and a laser light irradiated surface of the surface 51 was roughened. However, the duty ratio was adjusted by the method for pulsing by operating a galvano mirror while laser light is irradiated continuously. FIG. 15 to FIG. 18 show an SEM photographs of surfaces of aluminum molded bodies after irradiation of laser light in Examples 30 to 33. Each measurement was carried out in the same manner as in Examples 1 to 16.

The laser apparatuses used here were as follows.

Oscillator: IPG-Yb fiber; YLR-300-SM (manufactured by IPG Photonics Corporation)

Condensing system: fc=80 mm/fθ=100 mm

Defocus distance: ±0 mm (constant)

Galvano Scanhead: Squirrel 16 (manufactured by ARGES GmbH)

Galvano controller: ASC-1

Collimator for Squirrel 16 (f 80 mm): OPTICEL D30L-CL

TABLE 5

|  | Examples | | | | | | | |
| --- | --- | --- | --- | --- | --- | --- | --- | --- |
|  | 26 | 27 | 28 | 29 | 30 | 31 | 32 | 33 |
| Type of Metal Plate | A5052 | | | | | | | |
| Thickness of Metal Plate (mm) | 50.0 | | | | | | | |
| Laser Oscillator | Single Mode Fiber Laser | | | | | | | |
| Output (W) | 300 | 300 | 300 | 300 | 300 | 300 | 300 | 300 |
| Wavelength (nm) | 1069 | | | | | | | |
| Spot Diameter (μm) | 16.3 | | | | | | | |
| Energy Density (MW/cm$^2$) | 144 | 144 | 144 | 144 | 144 | 144 | 144 | 144 |
| Laser Irradiation Rate (mm/sec) | 10,000 | | | | | | | |
| Irradiation State | Dotted Line (FIG. 1) | | | | | | | |
| L1/L2 | 1/1 | 1/3 | 1/1 | 1/3 | 1/1 | 1/3 | 1/1 | 1/3 |
| Length of L1 (μm) | 1,000 | 500 | 500 | 250 | 200 | 100 | 100 | 50 |
| Frequency (Hz) | 5,000 | 5,000 | 10,000 | 10,000 | 25,000 | 25,000 | 50.000 | 50,000 |
| On time (μsec) | 100 | 50 | 50 | 25 | 20 | 10 | 10 | 5 |
| Duty Ratio (%) | 50 | 25 | 50 | 25 | 50 | 25 | 50 | 25 |
| Irradiation Pattern | Bidirectional (FIG. 2(b)) | | | | | | | |
| Number of Lines | 40 | | | | | | | |
| Intervals of Lines (b1) (mm) | 0.05 | | | | | | | |
| Number of Times of Repetitions (#) | 15 | 15 | 15 | 15 | 15 | 15 | 15 | 15 |
| Processing Area (mm$^2$) | 20 | | | | | | | |
| Maximum Groove Depth (μm) | 360 | 420 | 430 | 420 | 470 | 130 | 400 | 230 |
| Tensile Strength (MPa) | 30 | 16 | 39 | 20 | 46 | 22 | 57 | 29 |

As can be seen from Table 5 and FIG. 15 to FIG. 18, even when the method for pulsing by operating a galvano mirror is applied, the duty ratio can be adjusted in the same manner as in other examples for surface-roughening.

Note that, for example, "On time" in Example 26 was "100 μsec", which indicates that laser light was irradiated for 100 μsec and laser light was not irradiated for the remaining 100 μsec when the frequency was 5000 Hz (5000 vibrations per second; therefore, one vibration (for example, a distance from one peak to the next peak) corresponds to 200 μsec.). At this time, the duty ratio was 100/200=50.

INDUSTRIAL APPLICABILITY

The metal molded body obtained by the method of the present invention for roughening a metal molded body surface can be used as an intermediate for manufacturing a composite molded body described in the invention disclosed in JP-B 5701414, and may be used for a polishing material described in JP-A 2016-36884, a fine particle carrier disclosed in JP-A 2016-7589, and an application described in paragraph 0037 in JP-A 2016-43413.

The invention claimed is:

1. A method for roughening a metal molded body surface comprising:
   a laser light irradiation step of irradiating a surface of the metal molded body with continuously excited laser light at an irradiation rate of 2000 mm/sec or more and with an energy density of 10 to 1000 MW/cm$^2$ using a laser apparatus, wherein
   the laser light irradiation step is a step of irradiating laser light that includes, when the continuously excited laser light is irradiated to be in a straight line, a curved line, or a combination of a straight line and a curved line on the surface of the metal molded body to be roughened,
   using a fiber laser apparatus in which a modulation device of a direct modulation system to directly convert a laser drive current is connected to a laser power source, and adjusting a duty ratio determined from an ON time and an OFF time of an output of the laser light by the following expression, Duty ratio (%)=ON time/(ON time+OFF time)×100, thereby irradiating the laser light to alternately generate first portions irradiated by laser light and second portions not irradiated by laser light.

2. The method for roughening a metal molded body surface according to claim 1, wherein the fiber laser apparatus is a single mode fiber laser.

3. A method for roughening a metal molded body surface comprising:
   a laser light irradiation step of irradiating a surface of the metal molded body with continuously excited laser light at an irradiation rate of 2000 mm/sec or more and with an energy density of 10 to 1000 MW/cm$^2$ using a laser apparatus,
   wherein the laser light irradiation step is a step of irradiating laser light that includes, when the continuously excited laser light is irradiated to be in a straight line, a curved line, or a combination of a straight line and a curved line on the surface of the metal molded body to be roughened,
   using a combination of a galvano mirror and a galvano controller to pulse laser light continuously oscillated from a laser oscillator by the galvano controller, and adjusting a duty ratio determined from an ON time and an OFF time of an output of the laser light by the following expression, Duty ratio (%)=ON time/(ON time+OFF time)×100 thereby irradiating the laser light to alternately generate first portions irradiated by laser light and second portions not irradiated by laser light via the galvano mirror.

4. A method for roughening a metal molded body surface comprising:
   a laser light irradiation step of irradiating a surface of the metal molded body with continuously excited laser light at an irradiation rate of 2000 mm/sec or more and with an energy density of 10 to 1000 MW/cm$^2$ using a laser apparatus,
   wherein the laser light irradiation step is a step of irradiating laser light that includes, when the continuously excited laser light is irradiated to be in a straight line, a curved line, or a combination of a straight line and a curved line on the surface of the metal molded body to be roughened, continuously irradiating the continuously excited laser light in a state where masking members not allowing passage of laser light are disposed at intervals on the surface of the metal molded body to be roughened, and thereafter removing the masking members.

5. The method for roughening a metal molded body surface according to claim 1, wherein the metal molded body is a molded body having a thickness of 5 mm or smaller at a portion to be irradiated with laser light.

6. The method for roughening a metal molded body surface according to claim 3, wherein the metal molded body is a molded body having a thickness of 5 mm or smaller at a portion to be irradiated with laser light.

7. The method for roughening a metal molded body surface according to claim 4, wherein the metal molded body is a molded body having a thickness of 5 mm or smaller at a portion to be irradiated with laser light.

* * * * *